United States Patent [19] Heinzl et al.

[11] 4,084,681

[45] Apr. 18, 1978

[54] DRIVE SYSTEM FOR WRITING CARRIAGES IN PRINTING SYSTEMS

[75] Inventors: Joachim Heinzl; Güenter Rosenstock, both of Munich, Germany

[73] Assignee: Siemens Aktiengesellschaft, Berlin & Munich, Germany

[21] Appl. No.: 775,980

[22] Filed: Mar. 9, 1977

[30] Foreign Application Priority Data

Mar. 15, 1976 Germany .............................. 2610771

[51] Int. Cl.2 ......................... B41J 19/20; F16H 19/06

[52] U.S. Cl. ............................................. 197/82; 74/37; 197/89

[58] Field of Search ...................... 74/37; 197/1 R, 82, 197/89; 192/107 M

[56] References Cited

U.S. PATENT DOCUMENTS

| | | | |
|---|---|---|---|
| 1,887,981 | 11/1932 | Rosner | 192/107 M X |
| 2,593,470 | 4/1952 | Matthews et al. | 74/37 |
| 2,808,144 | 10/1957 | Lambert et al. | 197/183 |
| 2,911,835 | 11/1959 | Smith | 74/37 |
| 3,006,200 | 10/1961 | Woodhead | 74/37 |
| 3,670,861 | 6/1972 | Zenner et al. | 197/82 X |
| 3,753,481 | 8/1973 | Piola et al. | 74/37 X |
| 3,957,148 | 5/1976 | Milliser | 197/1 R |
| 3,966,035 | 6/1976 | Erickson | 197/1 R |

FOREIGN PATENT DOCUMENTS

| | | | |
|---|---|---|---|
| 646,261 | 8/1962 | Canada | 74/37 |
| 413,548 | 5/1925 | Germany | 74/37 |
| 892,179 | 10/1953 | Germany | 74/37 |
| 1,577,270 | 5/1966 | Japan | 74/37 |

*Primary Examiner*—Paul T. Sewell
*Attorney, Agent, or Firm*—Hill, Gross, Simpson, Van Santen, Steadman, Chiara & Simpson

[57] ABSTRACT

The invention is directed to drive systems for the writing head carriages of printing systems, particularly ink jet writing systems wherein the writing carriage is linearly moved for line printing by means of a non-reversing motor. Various connection systems and kinetic energy storage systems are disclosed.

14 Claims, 5 Drawing Figures

DRIVE SYSTEM FOR WRITING CARRIAGES IN PRINTING SYSTEMS

BACKGROUND OF THE INVENTION

1. Field of the Invention

This invention relates to writing systems, more particularly to drive systems for high speed line writing apparatus.

2. Description of the Prior Art

In high speed line writing systems such as ink writing systems, a writing head is normally linearly guided for line-by-line printing on a record carrier which may be paper. Movement of the writing head is caused by a motor device. The motor device normally consists of an electric motor coupled to a pulley system. In such systems the belt or cable is guided over the pulleys with the cable being connected to the writing carriage. In such an arrangement, the movement direction of the writing carriage is determined by the direction of rotation of the driving motor. Thus, both the writing carriage and the motor must be brought to a stop for each change of the carriage movement direction which occurs at the end of a line. In addition to stopping both the motor and writing carriage, of course, the motor and the writing carriage must thereafter be accelerated in the opposite direction.

When used in connection with very high speed writing systems, such as ink jet writing systems having a number of piezoelectrically driven ink jets arranged at a writing face of a writing head carried by the carriage, the writing speed depends to a great extent upon the time lost during reversal of direction of the writing head at the beginning and end of each line. In presently known writing systems of this type, writing carriage reversal is noisy, time consuming and energy expensive. It would be an advance in the art of machine writing to reduce these disadvantageous factors.

SUMMARY OF THE INVENTION

It is therefore the object of this invention to provide a drive system for the writing carriages of high speed printing equipment, such as ink jet writing devices, wherein the drive systems makes as little noise as possible and allows line writing on a record carrier both during advance and reversal of the writing carriage and wherein the reversal of movement of the writing carriage takes as little time as possible.

This objective is met, in accordance with the teachings of this invention, by guiding the writing carriage with a pulling system which during full line writing moves continuously over direction reversing rollers or sheaves mounted at opposite ends of the writing line.

In one embodiment of the invention illustrated, the writing carriage is caused to move by a pulling means which connects the writing carriage to the pulling means at a guide point, the guide point moving, during direction reversal, in a straight line perpendicular to the line movement motion of the writing carriage.

In order to reduce the energy expended in decelerating and accelerating the writing carriage at direction reversal at the ends of the lines, a mechanical energy storing means is provided. As herein particularly described, the mechanical energy storage means is of the type which will receive and store the kinetic energy of the writing carriage during deceleration at the end of a line and which will then return the energy to the carriage during acceleration at the beginning of reverse movement after the drive connection has passed around the sheave at the end of the line.

By storing and returning the kinetic energy of the writing head at line reversal, the system has the advantage of reducing the force demands on the drive motor such that the drive motor, essentially, only has to overcome friction losses.

The drive systems disclosed herein are relatively impact and jolt free, make little noise, and require a minimum of reversal time. Further, due to the reduction of wear parts within the disclosed systems, they are particularly easy to maintain while being safe to operate.

It is therefore an object of this invention to provide improved drive systems for high speed line writers particularly of the type utilizing linearly moving writing head carriages.

It is a more particular object of this invention to provide drive systems for high speed line writing systems utilizing reverse movement carriages wherein the movement of the carriage is controlled by an endless belt which is attached to the carriage through a connection member which passes around sheave wheels with the belt, the wheels being located adjacent the ends of the writing lines, and the connection members adapted to undergo a movement which is perpendicular to the line of movement of the writing carriage during writing carriage reversal.

It is another specific object of this invention to provide means for storing and returning kinetic energy to the writing carriage upon reversal of the writing carriage of high speed line writing equipment of the type which uses reverse movement writing head carriages.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

DESCRIPTION OF THE PREFERRED EMBODIMENTS

Figure 1:
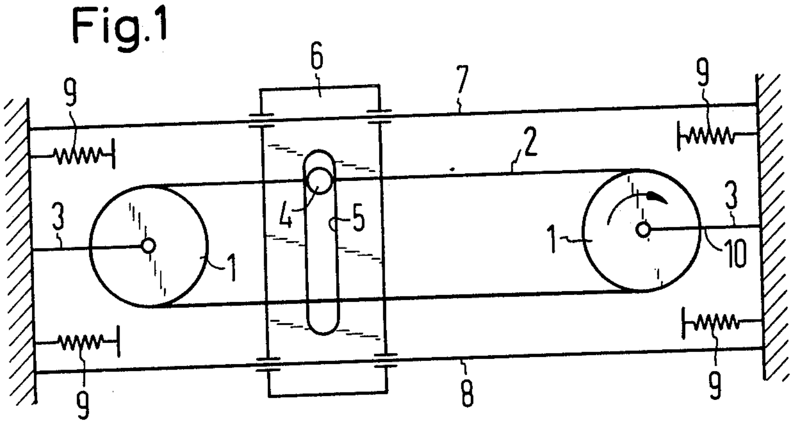
FIG. 1 is a schematic illustration of a drive system according to this invention.

FIG. 1 illustrates a drive system according to this invention. An endless belt 2 passes around spaced apart parallel axes rollers or sheaves 1. The belt 2 moves continuously during the writing operation. The rollers 1 are mounted to the frame of the mechanism through mounting means 3 including means allowing rotation of the rollers. One of the rollers is a powered roller. The belt is in positive connection with the rollers by means such as the use of cogged belt and roller interfaces.

A connecting pin 4 carried by the belt 2 is received in a slot 5 in the writing head carriage 6. The slot 5, as illustrated, may be a straight slot positioned with a longitudinal axis perpendicular to the direction of movement of the carriage. The carriage is supported on linearly extending guide bars 7 and 8 and moves along with the belt producing a line movement with respect to a record carrier such as a sheet of paper received around a platen roller.

Under rotation of the powered roller, for example in the direction indicated by the arrow, the carriage 6 will move along the guide paths 7 and 8. This causes a line movement of the carriage with respect to the stationary record carrier or platen. This movement will be linear and at a constant speed assuming constant rotation of the rollers 1. Thus, as long as the carrier pin 4 is in engagement in the slot 5, the carriage will be properly moved in a line movement for the length of the stretch of belt between the rollers. In this construction, the distance between the rollers will then be chosen to properly correspond to the full line length of the record carrier.

When the carrier pin 4 has traversed the distance between the spaced apart rollers 1 and has therefore reached one of the rollers and begun to move around it, because of the constant rotation of the roller, the carriage 6 will undergo a deceleration reaching a "zero" linear speed when the carrier pin 4 has undergone 90° of the 180° path around the roller and will thereafter accelerate for the remaining 90°. This deceleration-acceleration is according to the law of sines and is consistant each time the carrier pin undergoes a direction reversal at a roller. Due to the constant rotation of the rollers, although the carriage will undergo deceleration to "zero" and thereafter undergo acceleration to the full belt speed, it will accomplish this without impact or jolt.

However, of course, since the writing carriage 6 must be decelerated and then accelerated in an opposite direction, the kinetic energy of the moving carriage would normally be lost and would have to be reapplied in the opposite direction. However, if as in the embodiment shown in FIG. 1, spring elements 9 are positioned adjacent the rollers 1, the writing carriage 6 will move into them. By properly positioning the spring elements 9, it can be assured that the kinetic energy which would otherwise be lost in deceleration will instead be stored in the spring elements and will be returned to the carriage after reversal of movement and at the point of acceleration. That is, as the carriage pin 4 moves to the dead center position 10 the kinetic energy will be stored in the spring elements 9 and after movement past the dead center position 10 the springs will return the stored energy to the carriage as it is accelerated in the opposite direction. By choosing components such that the reversal distance corresponds approximately to half an oscillation of the spring system, which is assumed to consist of the particular spring element and the writing carriage mass characteristic, an optimum condition will be approached. In this manner, the system will correspond to the theoretical dynamic behavior of a writing carriage being pushed back and forth between two spring elements where friction is negligible and the spring 9 is itself assumed to be without mass. In this theoretically friction-free embodiment, the carriage would then move constantly back and forth between the springs without the necessity of added input. Therefore, it is only necessary to supply additional energy sufficient to take up the friction losses and other minor losses which would be encountered in the system thereby providing a system having a minimum force input requirement.

Figure 2:
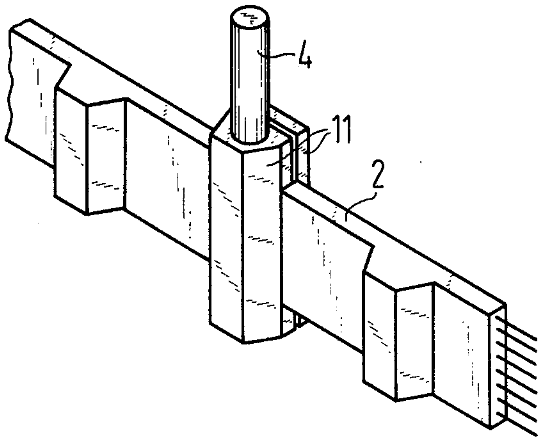
FIG. 2 is a fragmentary enlarged perspective view of a connection member used between writing carriages and drive belts according to this invention.

As shown in FIG. 2, the belt 2 may preferably comprise a cogged belt having a series of longitudinally spaced apart ribs. In this type of embodiment the pin 4 can be attached to the belt through a clamp member 11 having a profile the same as one of the raised belt areas. The carrier pin 4 projecting from the clamp will then be engaged in the straight guide or slot 5 of the carriage 6.

However, when using the straight slot 5, the carrier pin 4 will be subjected to wear due to engagement with the slot walls and due to the necessity of a rubbing movement occurring between the two as the pin 4 undergoes a movement perpendicular to the line movement of the carriage. This wear condition can be avoided through the use of a carrier belt connection such as shown in FIG. 3.

Figure 3:
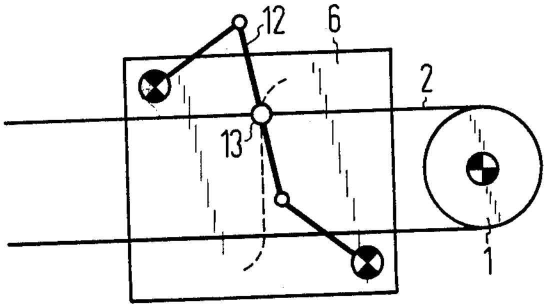
FIG. 3 is a diagrammatic representation of a second embodiment of the drive system of FIG. 1.

FIG. 3 illustrates a construction in which the carriage 6 is connected to the belt 2 by means of a Watts-type connection 12. The Watts-type connection utilizes a multiple articulated linkage in which the belt to linkage connection point 12 will undergo a substantially perpendicular movement to the belt as it passes around the roller 1. The movement of the point 13 is illustrated by the broken line in FIG. 3. In this type of connection, the sliding wear of the guide pin and straight slot in FIG. 1 will be eliminated.

Figure 4:
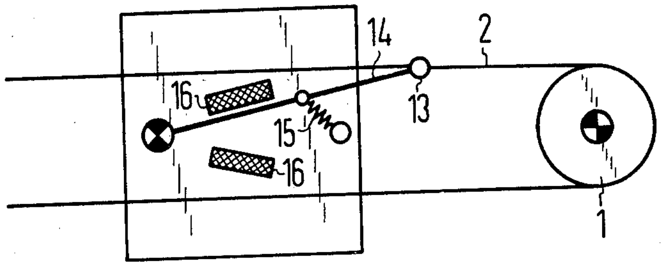
FIG. 4 is a view similar to FIG. 3 showing another embodiment of the drive system.

As an additional modification, in place of the impact springs 9 shown in FIG. 1, the force absorbing and returning spring can be made a part of the belt connection. Thus, as shown in FIG. 4, it is possible to use a belt to carriage connection assembly having a pivoted linkage member 14 which is acted upon by an over-center spring 15 attached to the carriage. In this type of construction, movement of the link 14 can be limited by stop members 16. Proper placement and sizing of the spring and proper placement of the stops 16 can insure that fluttering or oscillation of the point of connection 13 between the belt and the link will not occur during movement between rollers 1. In this construction, the energy storing and returning mechanism is thereby reduced to a single spring 15. Further, because impacted springs are not used, the assembly will make very little noise and will approach a completely silent construction. This type of over-center compression spring-to-link connection can be modified for designs other than the relatively straight link as shown in FIG. 4.

Figure 5:
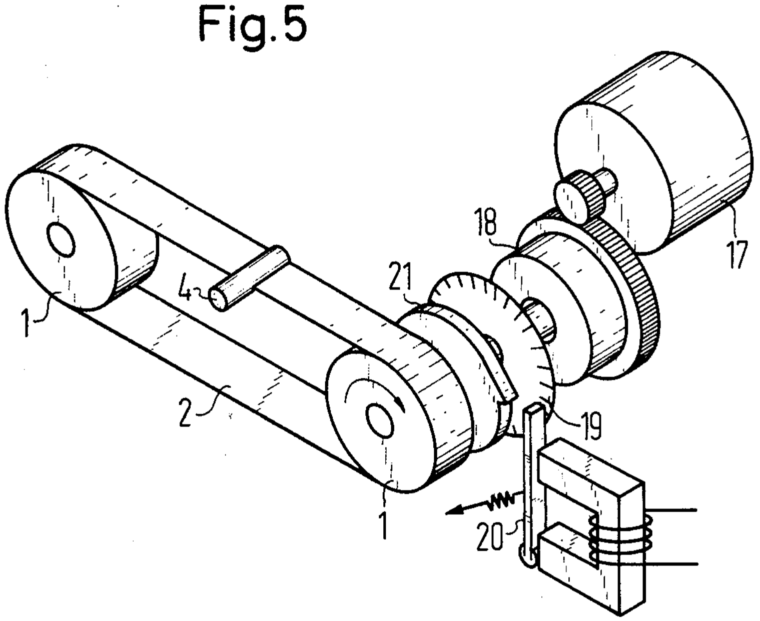
FIG. 5 is a schematic representation of the arrangement of drive system parts, including the motor connection, in accordance with the drive system of this invention.

FIG. 5 is a schematic exploded parts representation of a drive connection and control system for use in the drive of this invention. The motor 17 is a continuous rotation drive member and is connected with the axle of the roller 1 through a clutch member such as the felt slide coupling 18. It is, of course, possible to use a drive coupling other than the felt slide such as, for example, an electrically actuated mechanical coupling, or other type of known clutching system. A timing disc 19, used for proper positioning of the writing carriage on the driving belt, is positioned between the clutch 18 and the roller 1. This is used to properly synchronize the column-by-column positioning of the writing carriage.

Movement of the writing carriage itself can be stopped by means of an electromagnetically driven stop member 20 which is engageable with a ledged blocking element 21. This engagement is preferably timed to make contact when the carriage reaches "zero" writing speed during motion reversal. When using the energy storing spring constructions illustrated in FIGS. 1 and 4, it is possible for the writing carriage 6 to obtain the desired writing speed, after once having been started, with relatively little additional energy input from the motor 17.

The above drive connection for high speed jet writing equipment is extremely simple and can be produced at a relatively low cost. Further, due to its maintenance free construction, the operational safety and reliability of the overall writing system will be favorably enhanced.

It will therefore be seen from the above that we have provided a drive system for high speed line writing equipment, particularly ink jet writing equipment, wherein the writing carriage which moves linearly with respect to a record carrier is driven by connection to an endless belt moving between sheave rollers spaced apart a distance corresponding to the line distance, the sheaves being constantly rotated in one direction with the point of attachment from the belt to the carriage undergoing a reversal of direction as it moves around the rollers at the end of each line. Energy storing means are provided to store the kinetic energy of the moving carriage upon deceleration adjacent the end of one line and to return it to the carriage upon acceleration at the beginning of the next line.

Although the teachings of our invention have herein been discussed with reference to specific theories and embodiments, it is to be understood that these are by way of illustration only and that others may wish to utilize our invention in different designs or applications.

We claim:

1. A drive system for writing carriages of automatic writing systems comprising a linearly moveable writing carriage, a drive means for said writing carriage, a carriage connection to said drive means, said writing carriage moved back and forth along a line of movement by said drive means acting through said carriage connection, said connection moving around roller means adjacent ends of the line of movement of the writing carriage, the drive means including a driven belt passing around the roller means, the writing carriage undergoing movement in opposite directions along the line of movement with the writing carriage decelerating to zero velocity at the end of the line and then accelerating in the opposite direction and wherein a mechanical energy storing means is provided which receives the kinetic energy of the moving writing carriage during deceleration and returns said kinetic energy upon acceleration in the opposite direction.

2. The drive system of claim 1, wherein the writing carriage moves in a straight line between ends of the line and wherein the connection to the drive means has portions that undergo a movement substantially perpendicular to the straight line of the writing carriage during reversal of direction of movement of the writing carriage.

3. A drive system according to claim 2, wherein the writing carriage is connected to the drive means through a pivoted link connection.

4. The drive system of claim 1, wherein the energy storing means comprises a spring system consisting of a spring element and the writing carriage mass, the spring system having a natural oscillation which has a half-wave substantially equal to the linear movement distance during which motion reversal occurs.

5. The drive system of claim 1, wherein the writing carriage has a pivoted link connected thereto with a connection between the link and the drive means and wherein the energy storing means includes an over-center spring having one end connected to the carriage and an opposite end connected to the link.

6. The drive system of claim 5, wherein the link is a member pivotably attached to the carriage and which undergoes an oscillation between fixed stops upon movement of the link to drive means connection substantially perpendicular to the straight line during reversal of direction of movement of the writing carriage.

7. A drive system according to claim 1, wherein the drive means includes spaced apart parallel axis rollers with an endless belt means passing therearound and therebetween, one of the rollers being coupled to a prime driver through a force transmitting system that includes a clutch and an electrically actuable blocking means effective to stop the carriage at an end of the line of movement.

8. The drive system of claim 7, wherein the clutch consists of a felt slide coupling.

9. The device of claim 7, wherein the belt has a roller engaging face with spaced raised portions thereon mechanically indexing with the rollers.

10. A drive system for writing carriages of automatic writing systems comprising a pair of spaced apart parallel axis rollers, an endless belt passing around and between said rollers, a carriage guided for line movement between said rollers in a plane parallel to a plane intersecting the axis of the rollers, a mechanical connection between a point on said belt and said carriage, a prime means rotating one of said rollers in a constant direction, the connection to the belt at the point of connection to the belt passing around the rollers at the ends of the line of movement of the carriage whereby the carriage is oscillated back and forth by movement of the point of connection between and around the rollers means moving the belt around the rollers, the carriage being decelerated as the point of connection moves part way around a roller and is accelerated in an opposite direction as the point of connection moves further around the roller and wherein energy storing means are provided to store part of the kinetic energy of the carriage during deceleraton and to return at least a part of said stored kinetic energy to the carriage during acceleration.

11. The drive system of claim 10 including a lost motion connection between the belt and carriage.

12. The drive according to claim 11, wherein the connection includes an abutment member projecting from said belt, the abutment member received in a slot attached to said carriage, the slot having a major axis aligned substantially perpendicular to the direction of movement of the carriage.

13. The drive system of claim 11, wherein the connection between the belt and the carriage includes an articulated arm member pivotably connected to the carriage having a portion thereof connected to the belt at the point of connection.

14. The drive system according to claim 13, wherein the energy storing means includes a spring connected between the carriage and the articulated arm member.

* * * * *